Figure 1:
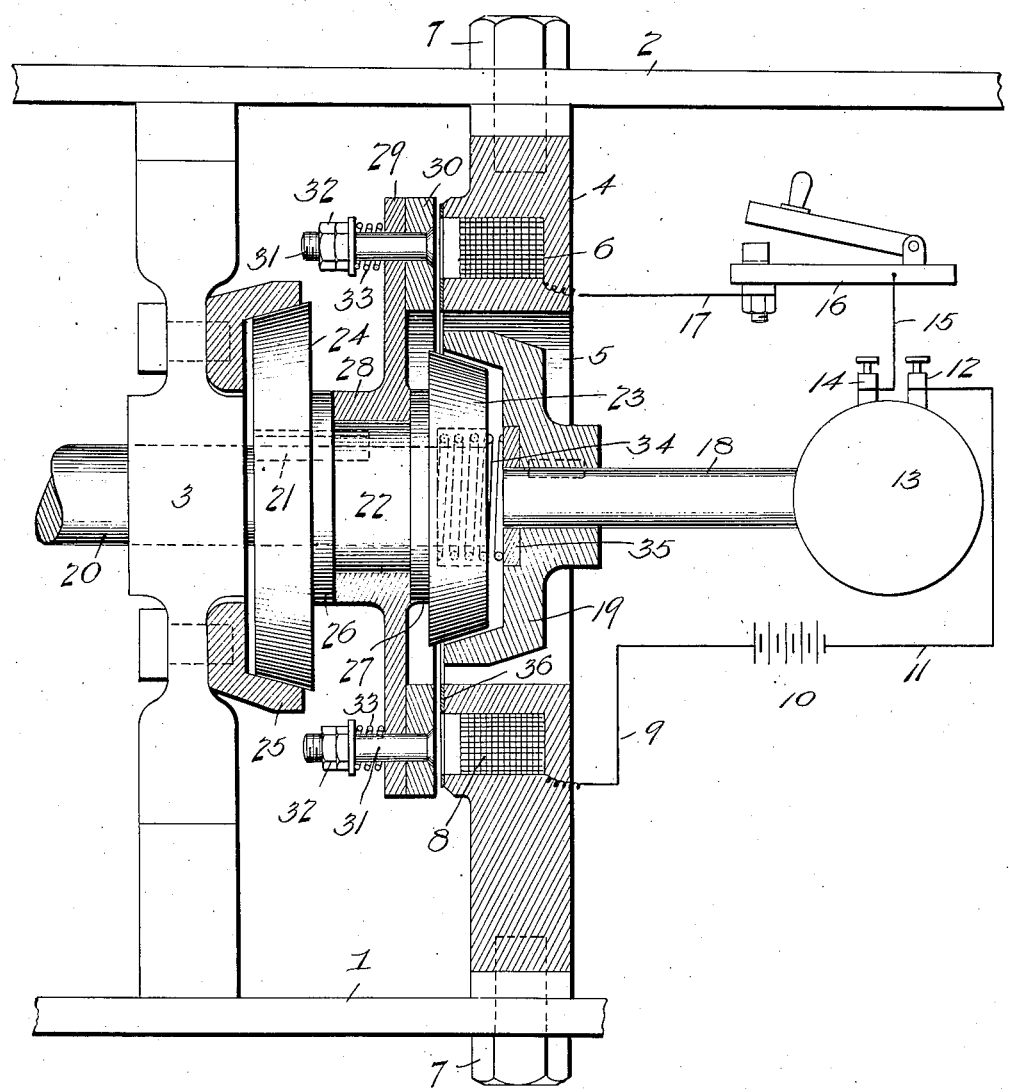

H. M. ABERNETHY.
FRICTION CLUTCH ELECTRIC CONTROL.
APPLICATION FILED APR. 3, 1908.

936,284.

Patented Oct. 12, 1909.
2 SHEETS—SHEET 1.

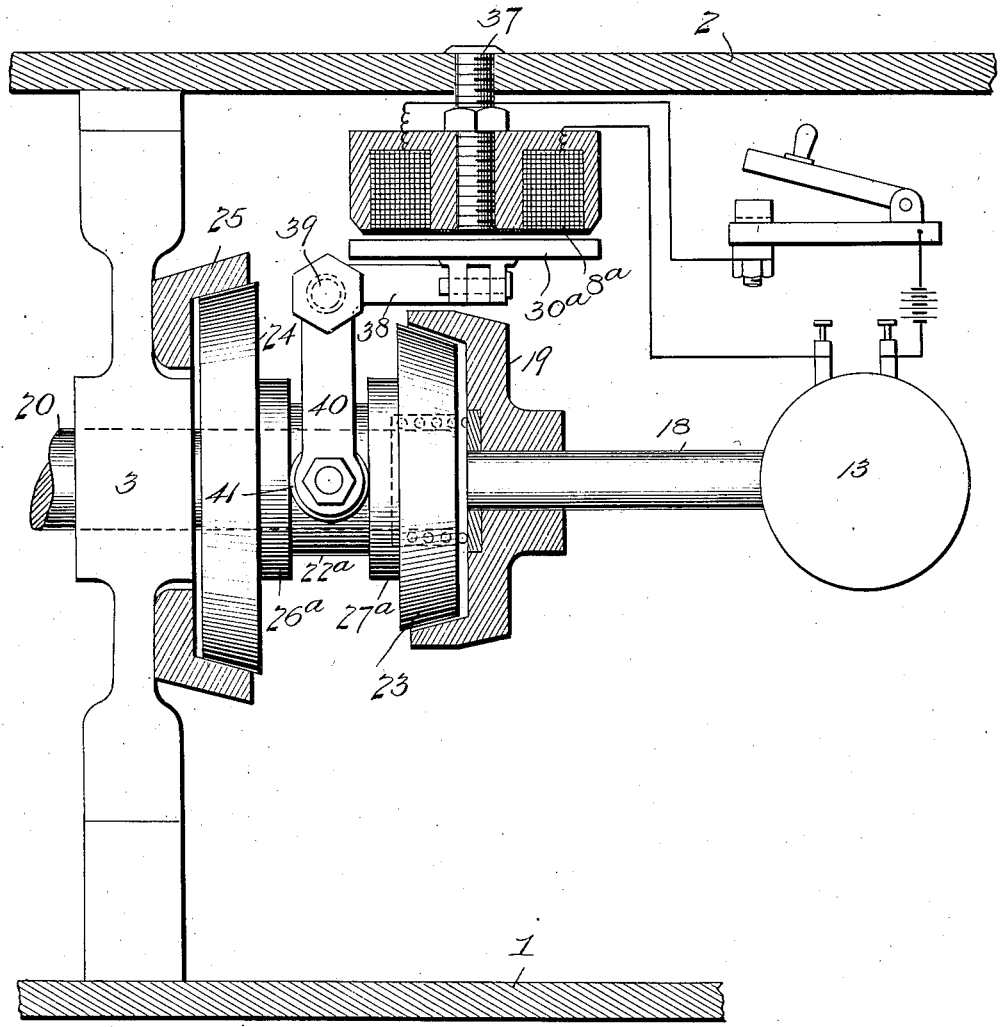
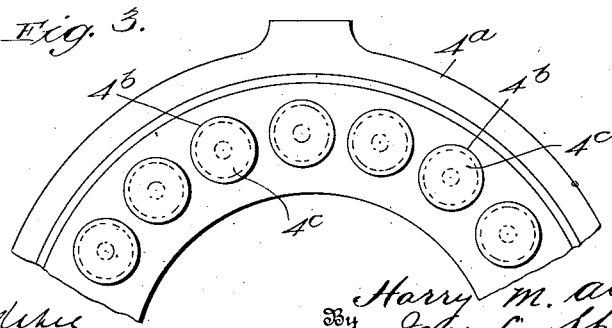

UNITED STATES PATENT OFFICE.

HARRY M. ABERNETHY, OF CLEVELAND, OHIO.

FRICTION-CLUTCH ELECTRIC CONTROL.

936,284.  Specification of Letters Patent.  Patented Oct. 12, 1909.

Application filed April 3, 1908. Serial No. 424,894.

*To all whom it may concern:*

Be it known that I, HARRY M. ABERNETHY, a citizen of the United States, residing at Cleveland, in the county of Cuyahoga and State of Ohio, have invented certain new and useful Improvements in Friction - Clutch Electric Control, of which the following is a specification.

This invention relates to electrically operated friction clutches, and its primary object is, to provide a clutch of simple and effective construction in which a non-revoluble armature is employed in coöperation with a stationary magnet.

A further object of the invention is to provide a clutch comprising coacting friction cones, for revolubly connecting two longitudinally alined shafts, and a brake device for arresting the revolution of one of said shafts.

The construction of the improved friction clutch will be fully described hereinafter in connection with the accompanying drawings which form a part of this specification, and its features of novelty will be set forth in the appended claims.

In the drawing—Figure 1 is a view partly in side elevation and partly in vertical section, of an electrically-controlled friction clutch embodying the invention. Fig. 2 is a similar view of a modified construction of the clutch, and Fig. 3 is a detail view illustrating a further modification.

Referring to Fig. 1 the reference numerals 1 and 2 designate parallel supports or frame bars, between which are secured a shaft bearing 3, and a frame 4, the latter being formed with a circular opening 5, and an annular recess 6 surrounding the opening 5. The frame 4 is secured to the parallel supports 1 and 2 by bolts 7. A magnet coil 8 is arranged within the annular recess 6 of the frame 4, said coil being connected by a wire conductor 9 with one pole of a battery 10, the opposite pole of which is connected by a wire 11, to a binding post 12 of an electric motor 13. From another binding-post 14 of the motor a wire 15 leads to a switch 16, connected by a conductor 17 to the coil 8. The reference numeral 18 designates the shaft of the motor extending into the opening 5 of the frame and having keyed thereto a cone-shaped clutch member 19. Supported in the bearing 3 is a shaft 20 alined longitudinally with the motor shaft 18, and having secured thereto by a spline 21 a sleeve 22 provided at one end with a conical clutch member 23 adapted to fit within and frictionally engage the clutch member 19. At the opposite end of the sleeve 22 is another integral conical disk 24 adapted to fit within and frictionally engage a conical or cup-shaped ring 25 bolted to the bearing 3. The sleeve 22 is also provided with collars 26 and 27 between which is arranged a non-revoluble support consisting of a hub 28 through which the sleeve 22 extends, and an annular flange 29 to which is secured a ring armature 30 by means of bolts 31 and lock nuts 32, coil springs 33, being interposed between the flange 29 and the nuts to afford yielding connections for the armature. A coil spring 34 is also interposed between the clutch members 19 and 23, the latter being recessed to receive one end of said spring, and the member 19 being countersunk to receive a ring 35 fitting over the end of the motor shaft 18 the spring bearing against said ring. The function of this spring 34 is to retract the clutch member 23 and release it from the member 19 when the magnet coil 8 is deënergized.

The utility and operation of the clutch constructed as thus described will be readily understood. When the switch 16 is closed a circuit is completed from the battery through the magnet coil 8, and the latter attracts the armature 30 causing the non-revoluble supports 28 and 29 to move carrying with it the sleeve 22 and conical members 23 and 24. The clutch member 23 is thus forced into frictional engagement with the member 19, so that the shaft 20 will revolve with the motor shaft 18. When the magnet coil is deënergized by opening the switch 16 the spring 35 forces the clutch members 19 and 23 apart and forces the conical disk 24 into frictional engagement with the stationary conical member 25 said members 24 and 25 serving as a brake to arrest the motion of the shaft 20.

To prevent the magnetization of the armature 30, and its tendency to "stick" after the magnet coil has been deënergized I provide a thin washer 36 of copper or other suitable non-magnetic material covering the contact surface of the frame 4.

A distinguishing characteristic of the present invention is, that as both the magnet coil and armature are non-revoluble there will be no cutting of the lines of force between the magnet and armature to produce rotary motion, and hence the full and direct strength of the current is utilized in the attraction of the armature.

In Fig. 2 I have shown a modified embodiment of the invention in which the shafts 18 and 20, and elements carried thereby are substantially similar to those shown in Fig. 1. In this modification, however, the magnet frame 4 and the armature support 28, 29 are omitted. The magnet 8ª is suspended from the frame 2 by means of a screw 37. The armature 30ª is carried by a bell crank lever 38 pivotally secured at the point 39 and having its depending portion 40 bifurcated to straddle the sleeve 22ª. The lower ends of the forked arms of the lever 38 carry antifriction roller 41 which bear against the collars 26ª and 27ª of the sleeve. The operation of this modified form of the clutch will be obvious from the drawing in connection with the foregoing explanation.

In Fig. 3 is shown a further modification in which a magnet frame 4ª is employed provided with a series of circular recesses 4ᵇ within each of which is fitted a magnet coil 4ᶜ, said coils being employed in lieu of the single magnet coils shown in the other figures and being connected in series to a battery.

I would have it understood that the invention includes all such further modifications and variations in the details of construction as may fall within the terms and scope of the following claims.

Having thus described the invention what I desire to secure by Letters Patent and claim is:—

1. An electrically-operated friction clutch, comprising a clutch member mounted upon a revoluble shaft, a stationary magnet coil surrounding said clutch member, a second clutch member, mounted upon an independent shaft longitudinally alined with said revoluble shaft, and a non-revoluble armature surrounding said independent shaft and adapted to be attracted by said magnet coil.

2. An electrically-operated friction clutch comprising a conical member mounted upon a motor shaft, a stationary magnet coil surrounding said clutch member, a second conical clutch member mounted upon an independent shaft in longitudinal alinement with said motor shaft, a non-revoluble support provided with a central opening through which said independent shaft extends, an armature carried by said support and means carried by said independent shaft for causing said second clutch member to be moved when said armature is attracted by said magnet coil.

3. An electrically-operated friction clutch comprising a stationary frame provided with an opening, a magnet coil supported by said frame, a motor shaft extending within said opening, a conical clutch member mounted upon said motor shaft, a shaft bearing adjacent to said frame, a second shaft mounted in said bearing, a second conical clutch member mounted upon said shaft, a non-revoluble support having a central opening through which said second shaft extends, an armature carried by said support, and a sleeve upon said second shaft having collars on opposite sides of said support.

4. An electrically-operated clutch, comprising a stationary frame provided with an opening, and an annular recess, a magnet coil within said recess, a motor shaft extending within said opening, a conical clutch member mounted upon said motor shaft, a shaft bearing parallel with said frame, a second shaft within said bearing, a conical clutch member upon said shaft, a non-revoluble armature support having a central opening through which said second shaft extends, a sleeve provided with collars upon said second shaft, an armature carried by said support, means for retracting said longitudinally-movable shaft, and means for arresting its revolution.

5. An electrically-operated clutch, comprising a stationary frame provided with an opening, and an annular recess, a magnet coil within said recess, a motor shaft extending within said opening, a conical clutch member mounted upon said motor shaft, a shaft bearing parallel with said frame, a second shaft within said bearing, a conical clutch member upon said shaft, a non-revoluble armature support having a central opening through which said second shaft extends, a sleeve provided with collars upon said second shaft, an armature carried by said support, means for retracting said longitudinally-movable shaft, and means for arresting its revolution comprising coöperating conical brake members.

6. An electrically-operated friction clutch comprising a stationary frame provided with an opening, a magnet coil carried by said frame, a motor shaft extending within said opening, a conical clutch member mounted upon said shaft, a bearing adjacent to said frame, a second shaft within said bearing, a clutch member mounted on said second shaft, a non-revoluble support having a central opening through which said second shaft extends, an armature yieldingly-secured to said support, a sleeve upon said second shaft having collars on opposite sides of said support, a coil spring interposed between said clutch members and a brake consisting of coöperating conical members one carried by said shaft, and the other secured to said shaft bearing.

HARRY M. ABERNETHY.

Witnesses:
F. O. McCLEARY,
MAY M. PLYER.